United States Patent

[11] 3,619,264

| [72] | Inventors | Karl-Heinz Worms<br>Dusseldorf-Holthausen;<br>Stefan Gjavotchanoff, Monheim-Hitdorf,<br>both of Germany |
|---|---|---|
| [21] | Appl. No. | 787,199 |
| [22] | Filed | Dec. 26, 1968 |
| [45] | Patented | Nov. 9, 1971 |
| [73] | Assignee | Henkel & Cie GmbH<br>Dusseldorf-Holthausen, Germany |
| [32] | Priority | Dec. 28, 1967 |
| [33] | | Germany |
| [31] | | H 64 896 |

[54] PROCESS FOR THE PRODUCTION OF WATER-REPELLENT, FINELY-DIVIDED INORGANIC COMPOUNDS
4 Claims, No Drawings

[52] U.S. Cl. .................................................. 117/100,
106/308 Q, 117/123 C, 117/167
[51] Int. Cl. ........................................................ B44d 1/02,
C08h 9/00
[50] Field of Search............................................. 117/100,
123, 161, 167; 252/25, 28; 106/308

[56] References Cited
UNITED STATES PATENTS
| 2,599,683 | 6/1952 | Abrams et al.................. | 252/25 |
|---|---|---|---|
| 2,625,512 | 1/1953 | Powell............................ | 117/100 X |
| 3,003,536 | 10/1961 | Culbertson..................... | 117/100 X |
| 3,138,563 | 6/1964 | Morgan et al.................. | 117/100 X |
| 3,348,959 | 10/1967 | Csonka et al. ................. | 106/308 |
| 3,472,692 | 10/1969 | Isshiki .......................... | 117/100 X |

FOREIGN PATENTS
| 127,397 | 1/1945 | Australia....................... | 117/100 |
|---|---|---|---|
| 213,437 | 6/1956 | Australia....................... | 117/100 |
| 1,039,753 | 8/1966 | Great Britain................ | 252/25 |
| 940,108 | 5/1948 | France ......................... | 117/100 |

*Primary Examiner*—William D. Martin
*Assistant Examiner*—Mathew R. P. Perrone
*Attorney*—Hammond and Littell ABSTRACT: A process for imparting water-repellent properties to an inorganic compound which comprises treating said inorganic compound in a finely-divided form with from 1 to 20 percent by weight, based on the weight of said inorganic compound, of a compound having the formula

R–COOR' wherein R is the aliphatic remainder of a fatty acid having 10 to 26 carbon atoms and R' is selected from the group consisting of hydrogen and alkyl having from one to four carbon atoms at a temperature of from 150° C. to 350° C., and recovering a water-repellent inorganic compound.

PROCESS FOR THE PRODUCTION OF WATER-REPELLENT, FINELY-DIVIDED INORGANIC COMPOUNDS

THE PRIOR ART

Water-repellent or hydrophobic inorganic compounds, such as silicates and oxides, find extensive use in practice. Such substances are incorporated in lubricants and drawing assistants or are used for the removal of mineral oil, for example, when oil tankers are discharged. These substances, when not water-repellent, are, owing to their surface characteristic capable of absorbing oil or organic liquids to a certain extent. Since they are hydrophilic, however, they will always absorb substantially only the aqueous phase when water or oil can be absorbed simultaneously. The water-repellent products, on the other hand, take up practically exclusively the hydrophobe phase, that is, the oil phase. Making inorganic fillers hydrophobic is also advantageous in certain cases before their incorporation in dispersions of plastics.

Several processes for imparting hydrophobic properties are already known, for example, silicates are treated for this purpose with acid and then suspended in a relatively large amount of alcohol, preferably in butanol. The water present is then distilled off azeotropically. The process is complicated, however, since the amount by weight of alcohol used, amounts to 20 times that of the silicate. Furthermore, it has been proposed to use alkylchlorosilanes for imparting hydrophobic properties. The evolution of HCl which thereby occurs makes very great demands upon the material of the reactor. In addition, water-repellent barium silicate has already been prepared by precipitation in the presence of stearic acid. Since the precipitation is effected from relatively dilute solutions, and the precipitated product contains considerable quantities of water, large amounts of water have to be evaporated.

OBJECTS OF THE INVENTION

An object of the present invention is the development of a cheap and effective process for the production of hydrophobic, finely-divided inorganic compounds capable of absorbing oily liquids.

Another object of the invention is the development of a process for imparting water-repellent properties to an inorganic compound which comprises treating said inorganic compound in a finely-divided form with from 1% to 20% by weight, based on the weight of said inorganic compound, of a compound having the formula

wherein R is the aliphatic remainder of a fatty acid having 10 to 26 carbon atoms and R' is selected from the group consisting of hydrogen and alkyl having from one to four carbon atoms, at a temperature of from 150° C. to 350° C., and recovering a water-repellent inorganic compound.

These and other objects of the invention will become more apparent as the description thereof proceeds.

DESCRIPTION OF THE INVENTION

The present invention provides a process for imparting water-repellent properties to an inorganic compound. This process comprises treating said inorganic compound in a finely-divided form with from 1% to 20% by weight, based on the weight of said inorganic compound, of a compound having the formula

wherein R represents an aliphatic residue of a fatty acid with 10 to 26 carbon atoms, and R' represents a hydrogen atom or an alkyl group having from one to four carbon atoms, at a temperature of from 150° C. to 350° C.

The inorganic compounds in finely-divided form utilized in the process are all those inorganic compounds which are capable of absorbing oily liquids or are useful as pigments or fillers in plastic formulations. These compounds are primarily finely-divided oxides, silicates and carbonates of divalent and trivalent metals.

The finely-divided inorganic compounds used should suitably have a bulk density which lies below 400 gm. per liter. In the case of compounds of the heavy metals, especially lead and iron, however, somewhat higher bulk densities are also of some importance and may be considered.

Neutral and basic carbonates can be provided with water-repellent properties. In particular, the metals zinc, tin, aluminum, iron, lead, cadmium and bismuth form basic carbonates which are suitable for the above process. Examples of suitable neutral carbonates are calcium, barium, strontium, magnesium, cadmium, zinc, nickel, iron and lead carbonates. Suitable oxides are especially calcium, barium, strontium, magnesium, aluminum, iron, cadmium, bismuth, nickel, cobalt and lead oxides.

Silicates suitable for the water-repellent treatment are especially aluminum, calcium, and magnesium silicates, and also Perlite. The latter consists of volcanic silicates with many small occlusions of water. By heating to over 1,200° C., expanded Perlite is obtained which, owing to expansion, occupies about 20 times its original volume. This expanded Perlite is preferably used. In addition, silicates are suitably used which may be prepared by reacting alkali metal silicates, such as sodium or potassium silicates, with salts of di- or trivalent metals. The reaction may be effected by precipitation or by heating mixtures of the corresponding solid compounds.

A preferred method consists in heating solid water-containing sodium or potassium silicate with calcium chloride. The amount of calcium chloride is preferably such that in the solid product the atomic ratio of Ca:Na or K is 1:2. The solid water-containing alkali metal silicates may be prepared by spray-drying solutions of alkali metal silicates. Products of this type are, for example, obtainable under the trade name "Portil."

The fatty acids suitable for producing hydrophobic effects have a chain length of 10 to 26, preferably 12 to 20 carbon atoms. Therefore, commercial products, for example, alkanoic acids, such as lauric acid, myristic acid, palmitic acid, margaric acid, stearic acid, arachidic acid, and behenic acid, or alkenoic acids, such as oleic acid, are especially suitable. Of course, mixtures of these compounds can also be used or, especially, also fatty acid mixtures formed in technical operations which contain fatty acids with 10 to 26 carbon atoms, as well as synthetic fatty acids. The fatty acids may be branched or unsaturated.

Instead of fatty acids, their alkyl esters with one to four carbon atoms in the alkyl residue may be used. The readily accessible methyl esters have been found particularly suitable.

The operation of the process is simple. It is merely necessary to treat the components in the given relative proportions at temperatures from 150° C. to 350° C., preferably 180° C. to 300° C. The amount of fatty acids or their alkyl esters, based on the finely-divided inorganic compounds, amounts to 1% to 20%, preferably 2% to 10% by weight. The treatment time is in general 15 to 150 minutes. A longer time of treatment gives practically no improvement in the results, but shorter treatment times can be used if only a small water-repellent effect is desired.

The time for obtaining a maximum water-repellent effect may be somewhat shortened by mixing the components before or during the heating. It also depends to some extent on the magnitude of the surface of the inorganic compound to be made water-repellent, so that in the case of very finely divided substances, it is expedient to use a somewhat larger amount of fatty acid or its alkyl esters.

The process is suitably carried out in an autoclave. This may be either evacuated or filled with an inert gas such as nitrogen. The process may also be carried out, however, in air-filled autoclaves, in a rotary tubular furnaces or similar reaction vessels, such as, for example, externally heated enclosed screw mixers. When fatty acid esters are used as the agents for imparting water-repellent effects, the process is preferably carried out in autoclaves. The process may be operated continuously or discontinuously.

The advantages of the new process lie in its simple method of operation, which does not require removal of solvents or the use of apparatus specially resistant to corrosion.

The water-repellent oxides, silicates and carbonates of di- and trivalent metals so prepared are generally products with a high absorptive capacity for mineral oil and similar liquid hydrophobic substances and can, therefore, serve, for example, for the removal of oil on water.

The following examples are illustrative of the practice of the invention without, however, being deemed limitative in any manner.

EXAMPLE 1

50 gm. of finely powdered calcium carbonate were mixed with 3.3 gm. of stearic acid and heated for 60 minutes at a temperature of 200° C. in an autoclave which was filled with nitrogen at atmospheric pressure. The water-repellent calcium carbonate so obtained could absorb 3.3 times its weight of commercial machine oil.

When the process was operated in the same way, but the autoclave was evacuated, a product with practically the same properties was obtained.

The oil-absorbing capacity was determined as follows. A wide-walled glass beaker was half filled with water and a weighed amount of the oil to be examined, which had been previously colored with Crystal Violet, was placed on the surface of the water. Increasing amounts of the hydrophobic inorganic product were then added until all the oil was absorbed or a solid continuous cake had formed, which could easily be skimmed off. The absorptive capacity was calculated from the relative proportions of the above-mentioned quantity of oil and the added inorganic substance.

EXAMPLE 2

Commercial expanded Perlite was treated in an evacuated autoclave with the hydrophobic treatment agents listed in the following table I, under the conditions and with the relative proportions given therein. The amount of hydrophobic treatment agent in percent by weight is based on the Perlite used. Good water-repellent products were obtained, the oil-absorbing capacity of which amounted to a multiple of the Perlite treated and is also given in table I.

TABLE I

| Hydrophobic treatment agent | Percent by weight of hydrophobic treatment agent | Temperature of heating in, ° C. | Time of heating in minutes | Oil-absorbing capacity (machine oil), times |
|---|---|---|---|---|
| Methyl stearate | 1.5 | 250 | 30 | 4.7 |
|  | 5 | 300 | 30 | 4.7 |
|  | 5 | 180 | 30 | 3.3 |
|  | 3.5 | 350 | 30 | 3.3 |
| Stearic acid | 3.5 | 300 | 60 | 2.1 |
| Palmitic acid | 3.5 | 300 | 60 | 2.1 |

EXAMPLE 3

50 gm. of finely powdered PbO were mixed with 2.5 gm. of tallow fatty acid and treated at 250° C. for 1 hour in a laboratory rotary furnace. A good water-repellent product suitable as a pigment was obtained.

Finely powdered $Fe_3O_4$ or BaO can be converted into a water-repellent pigment in the same way.

EXAMPLE 4

60 gm. of basic zinc carbonate (approximate composition: $ZnCO_3 \cdot 2 \cdot 3H_2O$) were mixed with 4 gm. of stearic acid and the mixture was heated at 250° C. for 1 hour in an autoclave. 1 gm. of the water-repellent product so obtained absorbed 2.5 gm. of machine oil or about 2 gm. of petroleum.

EXAMPLE 5

200 gm. of barium carbonate were mixed with 12 gm. of stearic acid and the mixture was heated at 250° C. for 1 hour in an autoclave. The product obtained absorbed about 1.5 times its weight of machine oil.

EXAMPLE 6

A water-containing silicate of a composition of 26.4% by weight of $Na_2O$, 52.9% by weight of $SiO_2$ and 20.6% by weight of $H_2O$ was prepared by spray drying an alkali metal silicate solution. The silicate was mixed with a quantity of commercial calcium chloride such that the atomic ratio Ca:Na amounted to 1:2. This mixture was heated at a temperature of 500° C. to 600° C. in a rotary furnace. A finely-grained product with a bulk density of about 30 gm. per liter was obtained.

10 gm. of the silicate so prepared were treated with 1.5 gm. of palmitic acid at 200° C. for 30 minutes in a laboratory rotary furnace. The hydrophobic product absorbed about 6 times its amount of machine oil.

EXAMPLE 7

In the following tables II and III the results are given which were obtained with different inorganic substances to be subjected to hydrophobic imparting treatment under the conditions given therein. The amount of the hydrophobic treatment agent in percent by weight is based on the weight of the substance to be treated in each case. The experiments were carried out in an evacuated autoclave or in a laboratory rotary furnace.

TABLE II

| Substance to be hydrophobic | Hydrophobic treatment agent | Percent by weight | Temperature, ° C. | Time of heating in minutes | Oil-absorbing capacity [1] |
|---|---|---|---|---|---|
| Calcium carbonate | Palmitic acid | 6.0 | 220 | 60 | 5.5 |
| Do | Tallow fatty acid | 6.0 | 250 | 60 | 5.3 |
| Do | Stearic acid | 3.3 | 200 | 40 | 3.5 |
| Do | do | 6.6 | 200 | 40 | 3.5 |
| Do | do | 10 | 200 | 40 | 3.5 |
| Zinc hydroxy carbonate | do | 13.3 | 200 | 40 | 3.3 |
| Do | do | 6.6 | 200 | 40 | 3.3 |
| Do | do | 6.6 | 300 | 60 | 2 |
| Magnesium oxide | do | 6.6 | 200 | 60 | 5 |
| Do | do | 13.3 | 200 | 60 | 4.5 |
| Do | Lauric acid | 10 | 200 | 30 | 1.4 |
| Do | Myristic acid | 12 | 170 | 15 | 2 4 |

[1] Gram machine oil/gram of product.
[2] Diesel oil.

TABLE III

| Substance to be hydrophobic | Hydrophobic treatment agent | Percent by weight | Temperature, ° C. | Time of heating in minutes | Oil-absorbing capacity [1] |
|---|---|---|---|---|---|
| Calcium carbonate | Tallow fatty acid methyl ester | 9 | 250 | 60 | 4.3 |
| Do | do | 6 | 250 | 60 | 4.3 |
| Barium carbonate | Methyl stearate | 6.6 | 200 | 60 | 4 |
| Zinc hydroxy carbonate | do | 6.7 | 220 | 60 | 5.6 |
| Do | Tallow fatty acid methyl ester | 5 | 250 | 60 | 5 |

[1] Gram machine oil/gram of product.

EXAMPLE 8

An enclosed mixing screw heated externally to 230° C was fed continuously with a mixture which contained 10 parts of palmitic acid to 100 parts of finely powdered magnesium oxide. The average speed of the mixing screw was chosen so that the average time of treatment was about 30 minutes. In this way a good water-repellent magnesium oxide was obtained in a continuous process.

The preceding specific embodiments are illustrative of the practice of the invention. It is to be understood however that other expedients known to those skilled in the art may be utilized without departing from the spirit of the invention.

We claim:

1. A process for imparting water-repellent properties to an inorganic compound which consists essentially of treating an inorganic compound in a finely-divided form, selected from the group consisting of oxides, silicates and carbonates of divalent and trivalent metals, with from 1% to 20% by weight, based on the weight of said inorganic compound, of a compound having the formula $$R-COOR'$$

wherein R is the aliphatic remainder of a fatty acid having 10 to 26 carbon atoms and R' is selected from the group consisting of hydrogen and alkyl having from one to four carbon atoms, at a temperature of from 180° C. to 300° C. for 15 to 150 minutes, and recovering a water-repellent inorganic compound.

2. The process as defined in claim 1 wherein said inorganic compound is a silicate formed by the reaction of a water-containing alkali metal silicate with a salt of a divalent metal.

3. The process as defined in any one of claims 1 and 2 wherein the treating step is conducted with from 2% to 10% by weight of said compound having the formula R—COOR'.

4. The process of claim 1 wherein said inorganic compound and said compound having the formula R—COOR' are intimately mixed together during said treating step.

* * * * *